(12) United States Patent
Kroth

(10) Patent No.: US 7,054,791 B2
(45) Date of Patent: May 30, 2006

(54) METHOD FOR MONITORING A DEVICE USED TO GUIDE AN ENERGY SOURCE SUCH AS A HANDLING DEVICE

(75) Inventor: Eberhard Kroth, Obernburg (DE)

(73) Assignees: Reis GmbH & Co. Maschinenfabrik Obernburg, Obernburg (DE); ELAN Schaltelemente GmbH & Co. KG, Wettenberg (DE)

( * ) Notice: Subject to any disclaimer, the term of this patent is extended or adjusted under 35 U.S.C. 154(b) by 59 days.

(21) Appl. No.: 10/669,643

(22) Filed: Sep. 25, 2003

(65) Prior Publication Data

US 2004/0107026 A1   Jun. 3, 2004

(30) Foreign Application Priority Data

Sep. 26, 2002 (DE) ................................ 102 45 188

(51) Int. Cl.
*G06F 11/00* (2006.01)

(52) U.S. Cl. ............................ 702/188; 702/58; 702/60

(58) Field of Classification Search ................ 702/188, 702/185, 189, 196, 198, 58–60, 94, 95; 700/79, 700/245

See application file for complete search history.

(56) References Cited

U.S. PATENT DOCUMENTS

| | | | | |
|---|---|---|---|---|
| 3,749,878 A | * | 7/1973 | Sullivan et al. | 219/121.67 |
| 4,415,231 A | * | 11/1983 | Kaczensky et al. | 359/230 |
| 4,453,221 A | * | 6/1984 | Davis et al. | 700/252 |
| 5,341,459 A | * | 8/1994 | Backes | 700/260 |
| 5,872,894 A | * | 2/1999 | Watanabe et al. | 700/252 |
| 6,317,651 B1 | * | 11/2001 | Gerstenberger et al. | 700/245 |
| 6,778,867 B1 | * | 8/2004 | Ziegler et al. | 700/79 |
| 6,798,990 B1 | * | 9/2004 | Brown et al. | 398/15 |
| 6,845,295 B1 | * | 1/2005 | Cheng et al. | 700/245 |
| 2001/0006168 A1 | * | 7/2001 | Okumura et al. | 219/121.7 |

FOREIGN PATENT DOCUMENTS

EP  0743130  11/1996

* cited by examiner

*Primary Examiner*—Marc S. Hoff
*Assistant Examiner*—Anthony Gutierrez
(74) *Attorney, Agent, or Firm*—Dennison, Schultz, Dougherty & MacDonald

(57) ABSTRACT

A method for monitoring a handling device (12) that is used to guide an energy source (14), wherein the energy source that applies energy to a work piece (16, 18) is moved at a speed V inside a protective cabinet (22). To allow the energy source to be moved relative to a work piece, without inadmissible temperature increases occurring, it is proposed that the speed of the energy source (14) moved inside the chamber be established as the current speed $V_{akt}$, that the current speed $V_{akt}$ of the energy source (14) be compared with a minimum speed $V_{min}$ that is dependent upon the power being emitted by the energy source, and that if the current speed should fall below the minimum speed $V_{min}$ at least the energy source (14) shall be switched off immediately or following expiration of an allowable period of time below this minimum speed.

6 Claims, 2 Drawing Sheets

METHOD FOR MONITORING A DEVICE USED TO GUIDE AN ENERGY SOURCE SUCH AS A HANDLING DEVICE

BACKGROUND OF THE INVENTION

The invention relates to a method for monitoring a device that is used to guide an energy source, such as a handling device, for the purpose of applying energy to a work piece (16, 18), which is positioned with the energy source inside a protective chamber that is enclosed by a protective wall, wherein the energy source is moved at a speed V and the speed V of the moved energy source is established as the current speed $V_{akt}$.

According to the current state of the art, handling devices for guiding energy sources in the form of laser sources that are used to machine work pieces are housed within a protective laser cabinet, to exclude any possible danger to personnel and neighboring technical systems by laser beams.

It is possible, however, for errors to occur in which a laser that is guided using a handling device may direct the laser beam at a single point or at very low speed toward an outer wall of the protective laser cabinet, so that the outer wall could become destroyed by the energy applied to it. The escaping laser light could then become a hazard to personnel and objects.

For this reason, it has already been provided that the walls of protective laser cabinets are designed to be actively gauging or multiple-shell, or of sufficient thickness, however these measures are highly cost-intensive.

Also known is a process by which an industrial robot is used to guide a gas flame along a plastic component, in order to alter its material properties. In this process it must be ensured that the component does not begin to burn.

In state-of-the-art monitoring methods it is further proposed that the handling device should actuate a preferably dual-channel monitoring switch at fixed time intervals, in order to enable an indirect monitoring of the motion control of the handling device. In this, the system will be switched off if the monitoring switch is not actuated within a firmly established window of time. This means that in the case of error, at the latest following the established monitoring time, the system, including the laser power, will be switched off. In this way it can be ensured that only a limited quantity of energy from the laser source can be applied to a point, for example on the wall of the protective laser cabinet.

To avoid having to interrupt a running production cycle in the device when the monitoring switch is actuated, the monitoring interval must be designed such that even in the most unfavorable case it is longer than the production cycle. But the cycle times for machining a component in a protective laser cabinet can easily range from 30 to 90 sec. Thus the quantities of energy that the laser beam would apply to a single point in the case of error are already so high that quite considerable wall thicknesses for the protective laser cabinet are necessary in order to prevent a breach of the cabinet wall with adequate certainty. For this reason, these alternative methods can be used only conditionally or at substantial cost.

From DE 100 40 920 A1, a process control for material machining using lasers is known. To cause an especially hand-guided machining head to automatically react to changing process parameters without motor-driven axles being absolutely necessary for processing a work piece, a speed-power control is provided in the machining head, whereby the power emitted by the laser is adjusted to the speed of the machining head.

From EP 0 743 130 A1 a control of a laser beam for machining a work piece is known.

SUMMARY OF THE INVENTION

Based upon the above, the object of the present invention is to improve upon a method of the type described above such that the energy source can be moved relative to a work piece without inadmissible temperature increases occurring, especially in the area immediately surrounding the work piece, and without requiring that the walls that enclose the protective cabinet be unnecessarily heavily dimensioned.

The object is attained in accordance with the invention essentially in that a minimum speed $V_{min}$ that is dependent upon the power emitted by the energy source (14) and/or at least one characteristic parameter from the wall enclosing the protective cabinet is established or preset; in that the current speed $V_{akt}$ of the energy source is compared with the minimum speed $V_{min}$; and in that if the current speed falls below the minimum speed $V_{min}$, the energy source, which operates at $V_{akt} > V_{min}$ at constant power or nearly constant power, will be switched off immediately or following expiration of an interval during which the current speed is allowed to remain below the minimum.

The invention is based upon the idea of preventing the energy source, positioned on the handling device, from dropping below a minimum speed, so that the energy, which is being applied over a specific pathway or at a single point, can be indirectly monitored. It is provided that the current speed of the energy source is determined and is compared with a minimum speed, and the system is switched off if the current speed drops below the preset minimum speed briefly or for a certain period of time. In this manner it is ensured that a quantity of energy emitted per distance unit by the energy source will not exceed a specified value.

With the temporal and/or local limitation of the quantity of energy applied, special arrangements relating to actively gauging or multiple-shell protective cabinets, or cabinets designed to have adequate wall thicknesses, are no longer necessary, since the walls can be much thinner in dimension than with traditional monitoring processes, depending upon the parameters of minimum speed and output of the energy source. In addition, a characteristic parameter of the walls of the protective cabinet, such as the wall thickness or the material the walls are made from, or the distance between the work piece to be machined and the surrounding walls, can be applied in determining or defining the minimum speed.

One preferred embodiment provides for the minimum speed to be set based upon the output of the energy source, especially the laser power of a laser source as the energy source. The period of time during which the speed is allowed to drop below the minimum can also be established based upon the output and/or the construction of a protective cabinet.

For monitoring the speed of the energy source, for example a laser source, which can be moved within the cabinet, it is provided that actual position signals are registered by drive units of the handling device, that Cartesian coordinates for the energy source are calculated from the actual position signals using a transformation operation, and that the calculated Cartesian coordinates are compared with stored values and/or value ranges in order to generate a signal to deactivate the handling device and to switch off the energy source if the transformed Cartesian coordinates should depart from the value and/or value range.

In one preferred method, a differential vector is calculated by subtracting a first set of Cartesian coordinates in a first sampling instant from a second set of Cartesian coordinates in a second sampling instant, wherein a Cartesian speed of the energy source over a time difference is determined in the first and second sampling instants, and wherein a signal to initiate the uncontrolled deactivation of drive units and/or the energy source is generated if the calculated speed drops below a preset minimum speed. In this, the monitoring of the speed is preferably cyclical.

When the energy source used is a laser source, based a laser power ranging from 100 to 500 watts, preferably 300 watts, the minimum speed $V_{min}$ will range from 5 mm/sec=$V_{min}$=20 mm/sec, preferably $V_{min}$–10 mm/sec.

If a work piece is machined at basically a constant or nearly constant energy output of the energy source, then the energy can be individually adjusted from work piece to work piece or for different areas of the work piece that is to be machined.

BRIEF DESCRIPTION OF THE DRAWINGS

Further details, advantages, and characterizing features of the invention are to be found not only in the claims, in the characterizing features found therein—alone and/or in combination—, but also in the following description of the exemplary embodiments illustrated in the drawings.

In these drawings.

DESCRIPTION OF THE PREFERRED EMBODIMENTS

Figure 1:
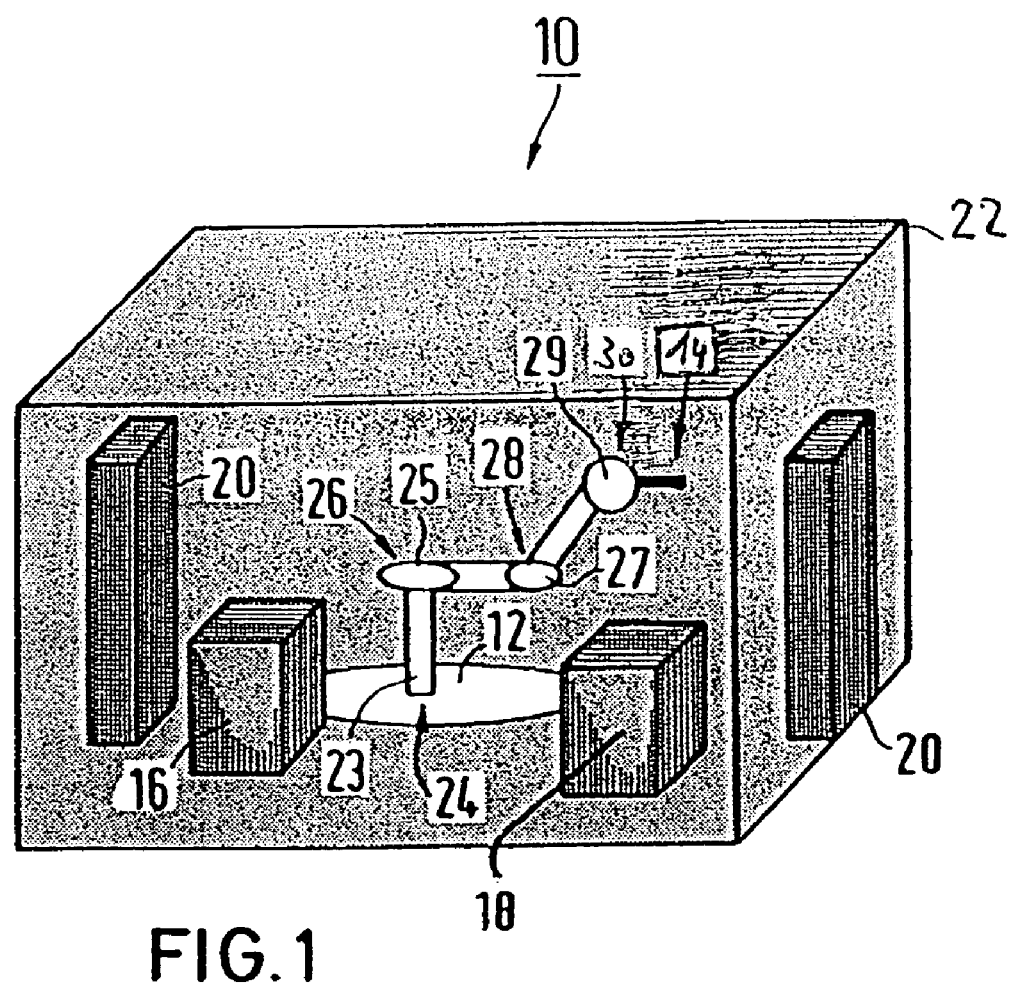
FIG. 1 is a schematic representation of an industrial system comprising a handling device used to guide an energy source, positioned within a protective laser cabinet.

In FIG. 1, an industrial system 10 that has increased safety requirements is illustrated. In the exemplary embodiment described, the industrial system 10 is comprised of a handling device 12 for guiding an energy source 14 used to machine or manipulate work pieces 16, 18 with energy such as laser beams or heat from, e.g., a gas flame. The work pieces 16, 18 can be loaded via specially designed safety gates 20 and positioned, together with the handling device 12, inside a safety device such as a protective cabinet 22.

The handling device 12 shall hereinafter be referred to as a robot 12. Also, for purposes of simplicity, the energy source shall hereinafter be referred to as a laser source, without serving thereby to limit the invention.

In the exemplary embodiment described here, the robot 12 can be rotated around preferably at least four axles 23, 25, 27, 29, wherein each axle 23, 25, 27, 29 is assigned one actuator, which in the exemplary embodiment is referred to as a drive unit 24, 26, 28, 30.

Figure 2:
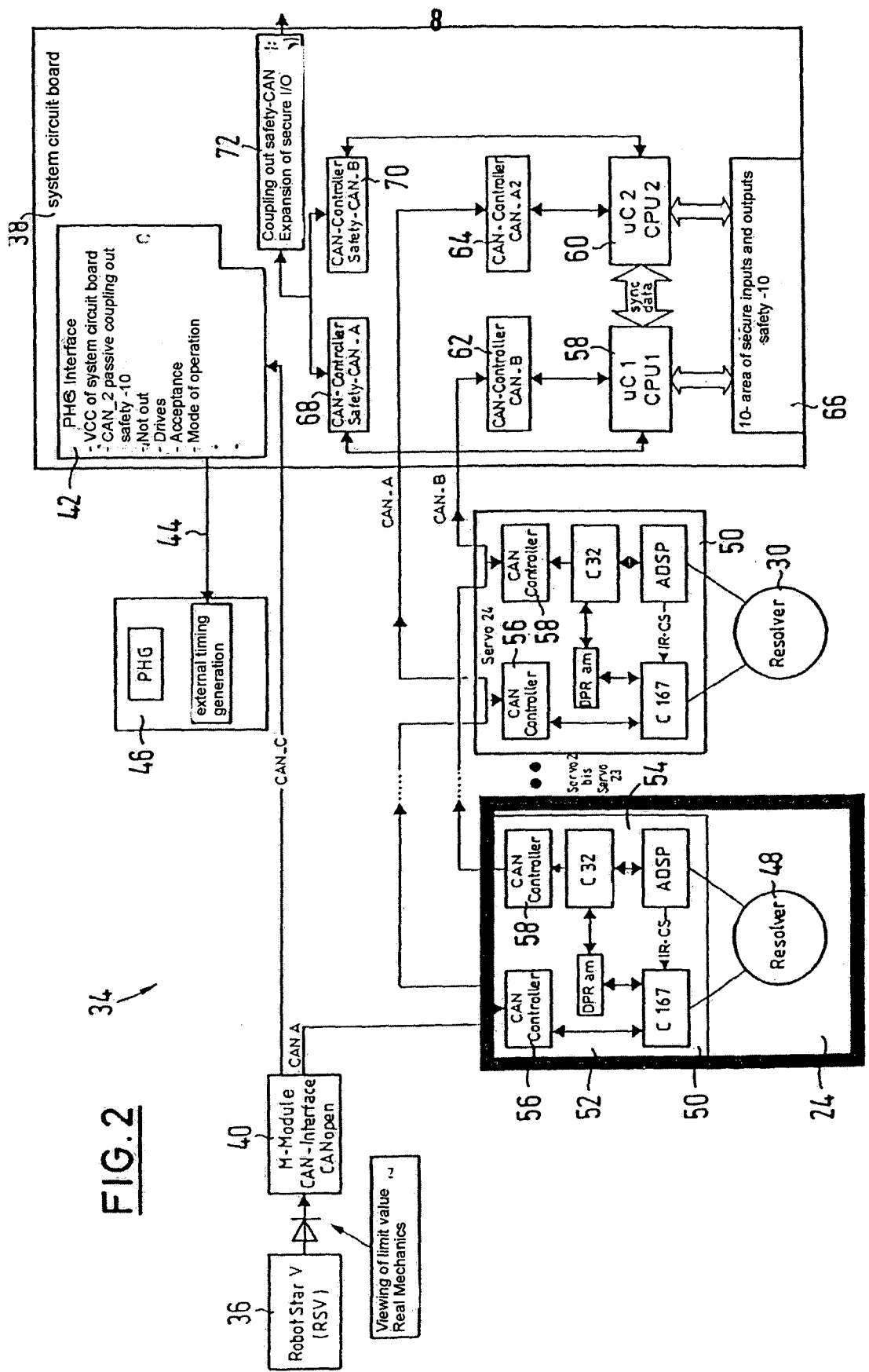
FIG. 2 is a control system for controlling the industrial system.

FIG. 2 shows a control system 34 comprised of a central and/or decentralized control unit such as a robot control unit 36, the drive units 24 through 30, and a monitoring and control device 38, hereinafter called a safety controller 38. The robot control unit 36 is connected via an interface 40 to a hand-held programming device 46, and via a bus line CAN_A to the drive units 24–30 and to the safety controller 38 in the mode of a line. Further, the safety controller 38 is connected to the hand-held programming device 46 via a connecting line 44. The hand-held programming device 46 can also be used to program the robot control unit 36, to which end the interface 42 of the safety controller 38 is connected via a bus line CAN_C and the CAN-interface 40 to the robot control unit 36.

The drive units 24–30 are similar in design, and shall be described using the drive unit 24 as an example. To register actual position signals, the drive unit 24 is equipped with a resolver 48, which is connected to a drive control 50 that is redundant in design. The drive control 50 has two channels or circuits 52, 54, wherein each channel comprises its own CAN controller 56, 58. The CAN controllers 56 are connected to one another via the operational bus CAN_A, which connects the drive control 50 to both the robot control unit 36 and the safety controller 38. The CAN controllers 58 are connected to one another via a further bus CAN_B, which connects the controller 58 with the safety controller 38. The drive unit 24 further comprises a motor, a power component, if necessary a transmission, and a braking unit (not illustrated here).

The safety controller 38 is also designed as a dual-channel controller, each channel being equipped with its own independent microcomputer 58, 60. Each of the microcomputers 58, 60 is connected via a CAN controller 62, 64 to the bus line CAN_B or the bus line CAN_A. Furthermore, the microcomputers 58, 60 are connected to an input/output layer 66, allowing them to control or read in secure inputs and outputs. Secure inputs and outputs of the input/output layer 66 are connected, e.g., to contacts in the safety gates 20, 22 in the protective cabinet 11. For additional data exchange, the microcomputers 58, 60 can be coupled to a host safety bus via additional CAN controllers 68, 70 and an interface 72.

The robot control unit 36 assumes the task of all central regulation and control, and is subject to no safety-relevant viewing methods. Especially, the robot control unit 36 is physically separate from the safety controller 38, so that operational sequences run in separate devices. It is provided that the safety controller is connected via the input/output layer 66 to the sensors or switching contacts of the protective gates 20, 22, and via the bus lines CAN_A and CAN_B to the actuators or drive units 24, 26, 28, 30, in order to evaluate, process, and control their status. Based upon the status of the switching contacts of the protective gates 20, 22 and/or the drive units 24, 26, 28, 30, the safety controller transmits at least one release signal to the control unit 36, so that the robot 12 can execute an action. The execution of the at least one action by the safety controller is then continuously monitored. In the event of error, at least one additional signal is generated, based upon which the system 10 is transferred to a safe status.

The additional signal is preferably a "STOP-1" function, i.e. the signal initiates a controlled deactivation, wherein the flow of energy to the drive units is maintained, in order to achieve deactivation and to interrupt the flow of energy only once deactivation has been achieved. The signal may be one from the STOP categories 0 or 2, or one that contains safety-relevant STOP functions in accordance with EN 60204.

In the robot control unit 36, all desired position values for the current drive units 24–30 are calculated and transmitted sequentially to the drive units 24–30 via the bus CAN_A. Each of the drive units 24–30 transmits an actual position value back to the robot control unit via the bus CAN_A, whereupon values such as slip and drag distance, etc., can be calculated in the robot control unit 36.

For the purpose of determining actual position value, the resolver 48 is provided, which is mechanically coupled to the engine directly via an engine shaft. Analog actual value signals are present at the output of the resolver 48, and are digitalized in the drive control 50. The resolver 48 supplies the drive control 50 with data, which promote the axle-specific regulation of processes. Especially, with the drive control 50, current control for the power component that controls the engine is achieved. The actual value data, however, are transmitted not only via the bus CAN_A to the robot control unit 36, but also redundantly via the bus lines CAN_A and CAN_B to the safety controller 38, where they are monitored.

To provide a method for monitoring the speed of the robot-guided laser 14 in order to prevent safety risks connected with the protective laser cabinet, a monitoring of the speed of the laser source 14 that is moved by the robot 12 is provided, to prevent the speed from dropping below a minimum speed. In this manner, the energy that is being applied over a specific pathway or at a specific point, for example on an outer wall of the protective laser cabinet 20, can be monitored.

In this, actual position signals are registered by the drive units 24–30, wherein Cartesian coordinates for the device-specific point, i.e. the laser source 14, are calculated using a transformation operation, and wherein the calculated Cartesian coordinates are compared with stored values and/or value ranges in order to generate a signal to deactivate the system, especially the laser source 14, if the transformed Cartesian coordinates should drop below the value and/or value range. In each case, from two transformed position values, a Cartesian speed for the laser source is calculated via differentiation, which is then compared with a minimum permissible speed. If the speed should drop below the minimum permissible speed, a monitored function is immediately initiated, wherein the laser source 14 is deactivated as rapidly as possible. The deactivation will take place if the value drops below the preset minimum value for a certain period of time (allowable time below value), i.e. if the quantity of energy applied by the robot-guided laser source were to exceed a certain value per distance unit.

The parameters of the monitoring, such as minimum drag and allowable time below value can be adjusted. These parameters are dependent upon the design of the protective laser cabinet, especially the sheet thickness of the walls of the protective laser cabinet and the installed laser power of the laser source.

What is claimed is:

1. Method for monitoring a device used to guide an energy source (14), such as a handling device (12), for applying energy to a work piece (16, 18) that is positioned with the energy source within a protective cabinet enclosed by protective walls, wherein the energy source (14) moves at a speed V and the speed V of the moved energy source is established as the current speed $V_{akt}$, characterized in that a minimum speed $V_{min}$, which is dependent upon the power emitted by the energy source (14), and at least one characteristic parameter of the protective walls that enclose the protective cabinet is established or preset; in that the current speed $V_{akt}$ of the energy source is compared with the minimum speed $V_{min}$; and in that if the current speed should drop below the minimum speed $V_{min}$, the energy source, which operates at $V_{akt} > V_{min}$ at constant power or nearly constant power, is deactivated immediately or following expiration of a period of time during which the actual speed is allowed to remain below the minimum speed.

2. Method according to claim 1, characterized in that especially a laser source or a heat source such as a flame is used as the energy source (14).

3. Method according to claim 1, characterized in that the time during which the current speed is allowed to remain below the minimum speed is established based upon the process parameter or parameters such as the output and/or the construction of a wall of the protective cabinet.

4. Method according to claim 1, characterized in that actual position value signals are registered by drive units (24–30), that from these actual position value signals Cartesian coordinates for the energy source (14) are calculated using a transformation operation, and in that the calculated Cartesian coordinates are compared with stored values and/or value ranges, in order to generate a signal to deactivate the system (12) and/or the energy source (14) if the transformed Cartesian coordinates should depart from the value and/or value range.

5. Method according to claim 4, characterized in that a differential vector is calculated by subtracting a first set of Cartesian coordinates in a first sampling instant from a second set of Cartesian coordinates in a second sampling instant; in that a Cartesian speed for the energy source is determined over a time difference between the first and second sampling instants; and in that a signal for an uncontrolled deactivation of the drive units and/or the energy source (14) is generated when the calculated speed falls below a preset minimum speed $V_{min}$.

6. Method according to claim 1, characterized in that monitoring of the current and minimum speeds is cyclical.

* * * * *